UNITED STATES PATENT OFFICE.

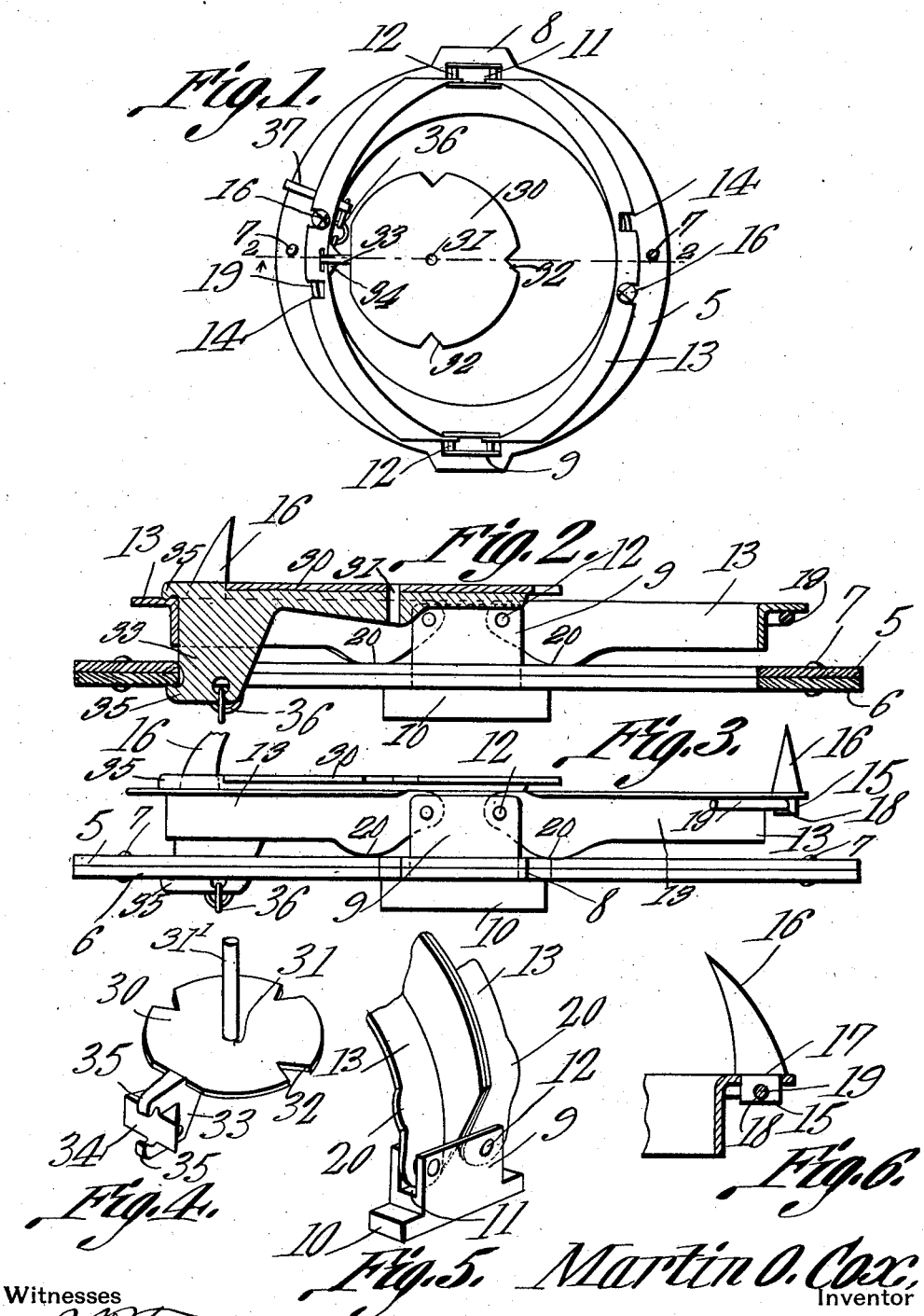

MARTIN O. COX, OF ALBERSON, OREGON.

TRAP.

1,009,283.   Specification of Letters Patent.   Patented Nov. 21, 1911.

Application filed May 19, 1911. Serial No. 628,178.

*To all whom it may concern:*

Be it known that I, MARTIN O. Cox, a citizen of the United States, residing at Alberson, in the county of Harney and State of Oregon, have invented a new and useful Trap, of which the following is a specification.

This invention relates to traps, and more especially to that kind thereof which have spring-actuated jaws; and the objects of the same are to produce improvements in the manner of fastening the teeth to the jaws and in the details of the pan. These objects are accomplished by the construction described and claimed below, and shown in the drawings wherein—

Figure 1 is a plan view of this trap, set. Fig. 2 is a central transverse section on the line 2—2 of Fig. 1. Fig. 3 is a side elevation of Fig. 1. Fig. 4 is an enlarged perspective detail of the pan. Fig. 5 is an enlarged sectional detail of the pivots at one side of the jaws. Fig. 6 is a sectional detail showing the manner of fastening the teeth.

The springs in this trap are preferably two flat rings 5 and 6 superposed upon each other and riveted together at diametrically opposite points as at 7, their normal tendency being to separate or spread apart from each other, at points quartering to the riveting points 7. The latter may be said to be the sides of the trap, and in that case we might say that the springs spread apart from each other at the ends of the trap, and at these points they are provided with registering rectangular eyes 8 through which pass blocks 9 having heads 10 at their lower ends so that they cannot be drawn upward out of the eyes. Within slots 11 in these blocks and on parallel pivots 12 are mounted the extremities of the jaws 13 which are preferably of L-shaped cross section as seen in Fig. 2 and are substantially semicircular in plan view so that they will overlie the springs as seen in Fig. 1 when the trap is set. In the radial flanges of the jaws are formed notches 14 adapted to register with each other when the jaws are closed together, and in certain of these notches are inserted the shanks 15 of teeth 16 so that the shoulders 17 between the bodies of the teeth and their shanks rests against the jaw while the shanks extend through it as best seen in Fig. 6. Said shanks are pierced with holes 18, and through the hole in each shank is passed a pin 19 (or equivalent fastening device) whereby each tooth is held removably attached to the jaw. As seen in Fig. 1, the teeth are set in one jaw opposite the notches in the other so that when the jaws come together the teeth pass through the notches and impale the animal being caught. Obviously the jaws are caused to swing together suddenly by the upward movement of the uppermost ring 5 which causes it to slide upward over the blocks 9 around the pivoted extremities of the jaws 13, adjacent which their outer edges are formed with enlargements or cams 20 as best seen in Fig. 5 against which the ends of the eyes 8 in the springs strike, so that the jaws are thrown forcibly together in a manner well known in this type of trap.

An important feature of my present invention consists in the exact construction of the bait holder or pan as best seen in Fig. 4. The pan itself comprises a flat plate 30 having a hole 31 through its center and notches 32 around its edge, the latter for the reception of a string or wire by means of which the bait can be tied thereon, and the hole for the passage through it of a pin or stake 31' by means of which the animal may strike the pin to operate the pan and throw the trap. Riveted beneath and extending to one side of the pan 30 is an arm 33 having across its outer end a head 34 of some little length, and the upper and lower portions of the arm are continued beyond the face of the head into lips 35. This arm is connected with the springs 5 and 6 by any suitable flexible means such as a chain 36 leading to a ring 37 which surrounds the springs at some suitable point adjacent their rivet 7.

In setting this trap, the eyes 8 at the ends of the trap are depressed until the upper spring 5 lies upon the lower spring 6 and the eyes of both surround the body of the blocks 9 above their heads 10 and below the pivots 12 through them. Then the jaws are spaced apart and depressed until they lie upon the uppermost spring as seen in Fig. 2, and finally the pan is brought into position and its lips 35 engaged over the jaw 13 at one side and under the lowermost spring 6 just beneath it as seen at the left of Fig. 2 in full lines. The parts being released, the tension of the springs at the ends of the trap causes a tendency on the part of the jaws at the sides of the trap to rise, and this tendency is resisted at one side by the fact that the jaw is held under the uppermost lip 35, and hence the jaw at the opposite side cannot rise. The bait is tied upon the pan by means of wire or cord passing through the notches 32. An animal approaches and nibbles at the bait, stepping on the pan in the act of doing so; this depresses the pan so that it moves to the position shown in dotted lines in Fig. 2 and the uppermost lip 35 disengages the jaw 13, after which the springs cause both jaws to fly upward as seen in dotted lines in Fig. 2. It will be understood that the teeth 16 at this time impale the animal who is standing upon the pan 30.

Thus it will be seen that I have produced an extremely simple trap which is light in weight and easy to make and to operate. When the teeth become dull they can be removed and sharpened, or in many cases the trap can be used without the teeth. When employed they should be finely tempered, and the other parts of the device may be made of strap iron and perhaps parts of it of castings.

What is claimed as new is:—

1. In a jaw trap, the combination with two flat circular springs superposed one on the other and connected at diametrically opposite points, the springs being provided with registering rectangular eyes at diametrically opposite points quartering to the points of connection; of two rectangular blocks whose bodies slidably fit said eyes and have enlarged heads at their lower ends and their upper ends slotted, two semicircular jaws of L-shaped cross section whose ends are mounted in said slots on parallel pivots, a tooth in the radial flange of each jaw and a notch in the radial flange of the other through which said teeth are adapted to pass as the jaws close, a bait pan, and trigger mechanism connected therewith and adapted to hold one jaw detachably open upon the springs.

2. In a jaw trap, the combination with a base member including a spring, the pivoted jaws, and connections between the spring and jaws tending to throw the latter normally together; of trigger mechanism including a bait pan, an arm projecting therefrom and having a cross head at its outer end and lips projecting beyond the head at the upper and lower sides thereof and adapted to embrace one jaw and its adjacent spring, for the purpose set forth.

3. In a jaw trap, the combination with a base member including a spring, the pivoted jaws, and connections between the spring and jaws tending to throw the latter normally together; of trigger mechanism including a bait pan, an arm connected therewith and having spaced lips adapted to embrace one jaw and the adjacent spring, a ring embracing the spring and the base member, and a chain connecting the arm and ring.

In testimony that I claim the foregoing as my own, I have hereto affixed my signature in the presence of two witnesses.

MARTIN O. COX.

Witnesses:
 FRANK CLERF,
 GUY OLLGARD.

---

Copies of this patent may be obtained for five cents each, by addressing the "Commissioner of Patents, Washington, D. C."